United States Patent
Drocco

(10) Patent No.: US 6,533,448 B1
(45) Date of Patent: Mar. 18, 2003

(54) SPIRAL-TYPE KNEADING MACHINE WITH A NON-ROTATING BOWL FOR THE PREPARATION OF FLOUR-BASED MIXTURES

(75) Inventor: Davide Drocco, Strada Castelpherlo (IT)

(73) Assignee: Sancassiano SpA, Cuneo (IT)

( * ) Notice: Subject to any disclaimer, the term of this patent is extended or adjusted under 35 U.S.C. 154(b) by 0 days.

(21) Appl. No.: 09/953,284

(22) Filed: Sep. 17, 2001

(51) Int. Cl.[7] .................................................. B01F 7/24
(52) U.S. Cl. .......................... 366/98; 366/306; 366/309
(58) Field of Search .............................. 366/96–98, 149, 366/197, 192, 207, 224, 287, 288, 306, 309; 99/348

(56) References Cited

U.S. PATENT DOCUMENTS

| | | | | |
|---|---|---|---|---|
| 1,415,735 A | * | 5/1922 | Trust et al. | |
| 2,577,802 A | * | 12/1951 | Payne | |
| 2,640,688 A | * | 6/1953 | Moller | |
| 2,651,582 A | * | 9/1953 | Courtney | |
| 4,311,397 A | * | 1/1982 | Wright | |
| 4,504,152 A | | 3/1985 | Moller et al. | |
| 4,515,483 A | | 5/1985 | Müller et al. | |
| 4,765,746 A | * | 8/1988 | Puig | |
| 4,766,766 A | * | 8/1988 | Ahlert et al. | |
| 4,790,665 A | * | 12/1988 | Hayashi | |
| 4,946,285 A | * | 8/1990 | Vennemeyer | |
| 5,150,968 A | * | 9/1992 | Inoue | |
| 5,312,183 A | * | 5/1994 | Drocco | |
| 5,482,366 A | * | 1/1996 | Konig et al. | |
| 5,498,074 A | * | 3/1996 | Moller et al. | |
| 5,556,201 A | * | 9/1996 | Veltrop et al. | |
| 5,779,360 A | * | 7/1998 | Tanaka | |
| 5,906,432 A | | 5/1999 | Wade et al. | |

FOREIGN PATENT DOCUMENTS

| | | |
|---|---|---|
| EP | 0 354 190 A | 2/1990 |
| EP | 0 551 571 A | 7/1993 |
| EP | 0 000 512 A | 2/1996 |
| EP | 0 714 606 A | 6/1996 |
| FR | 2 710 551 A | 4/1995 |
| FR | 2 546 719 A | 12/1996 |
| WO | 91/15143 | * 10/1991 |

* cited by examiner

Primary Examiner—Charles E. Cooley
(74) Attorney, Agent, or Firm—Sughrue Mion, PLLC

(57) ABSTRACT

A spiral-type kneading machine for the preparation of flour-based mixtures comprises a non-rotating circular bowl and a spiral-shaped kneading tool rotatable inside the bowl. The spiral-shaped kneading tool has its axis substantially coincident with the axis of the bowl and occupies substantially the entire space contained within the bowl. The tool cooperates with a fixed member projecting upwardly from the bottom of the bowl and spaced from the central axis thereof.

10 Claims, 5 Drawing Sheets

Fig_1
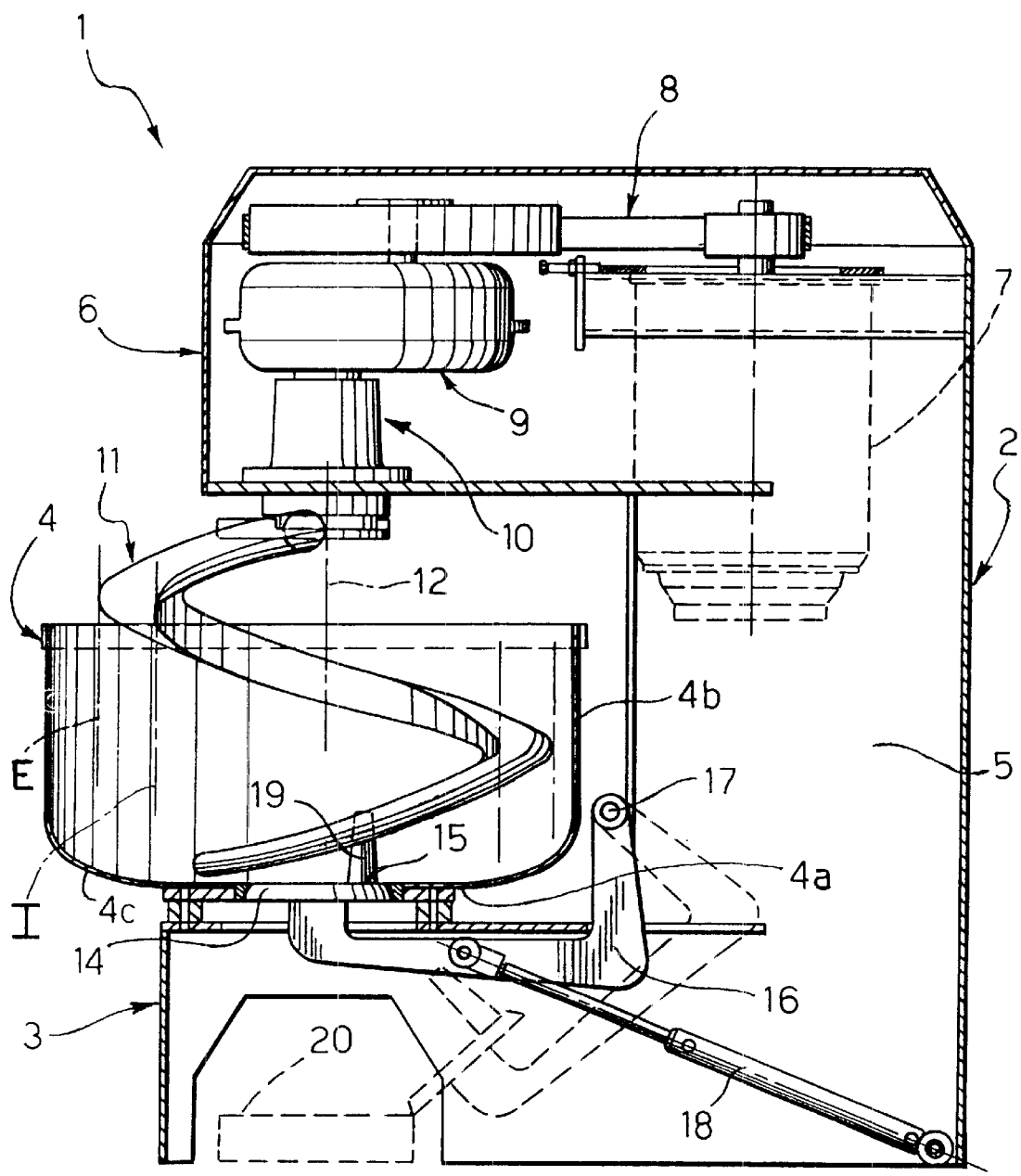

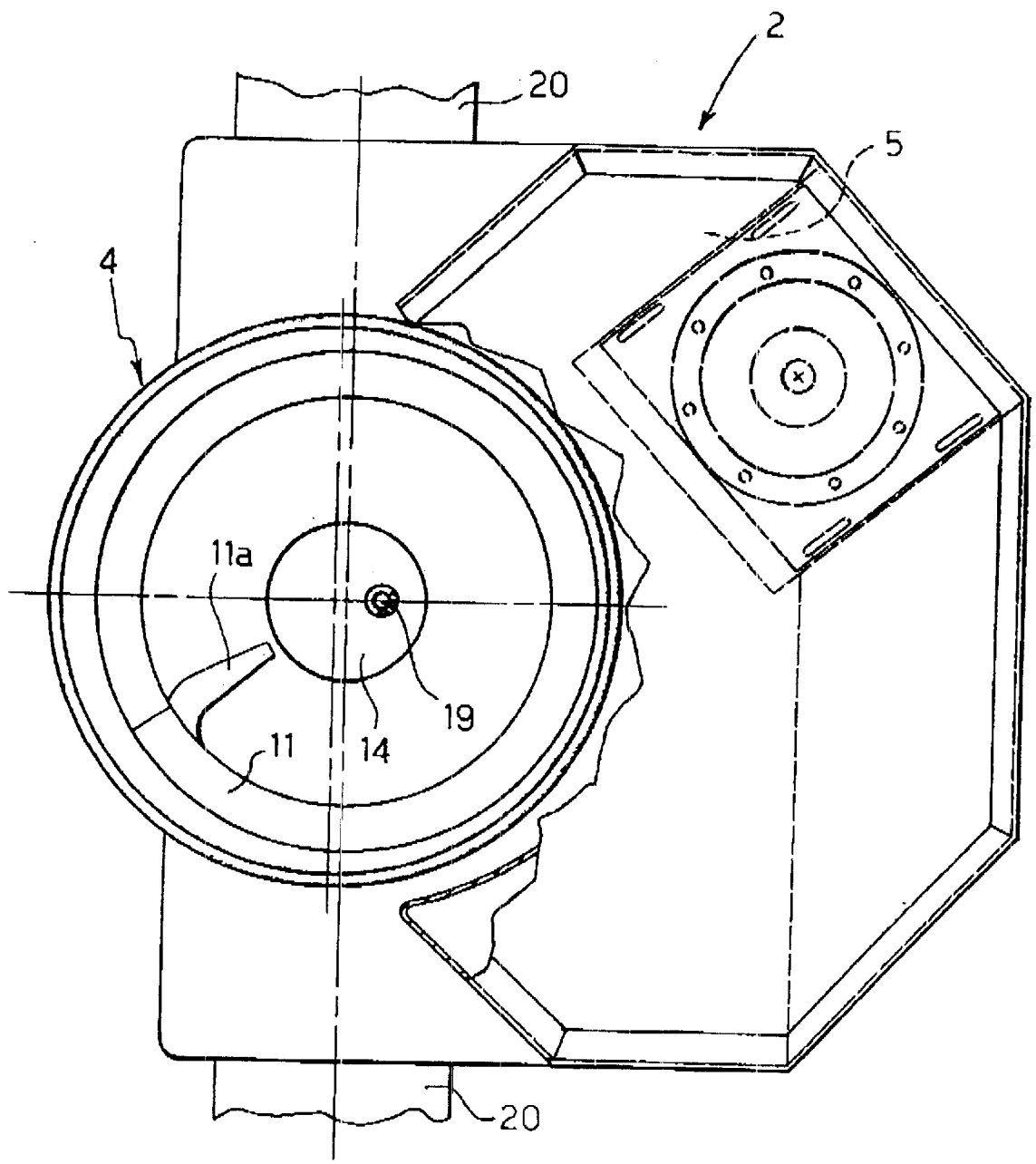
Fig_2

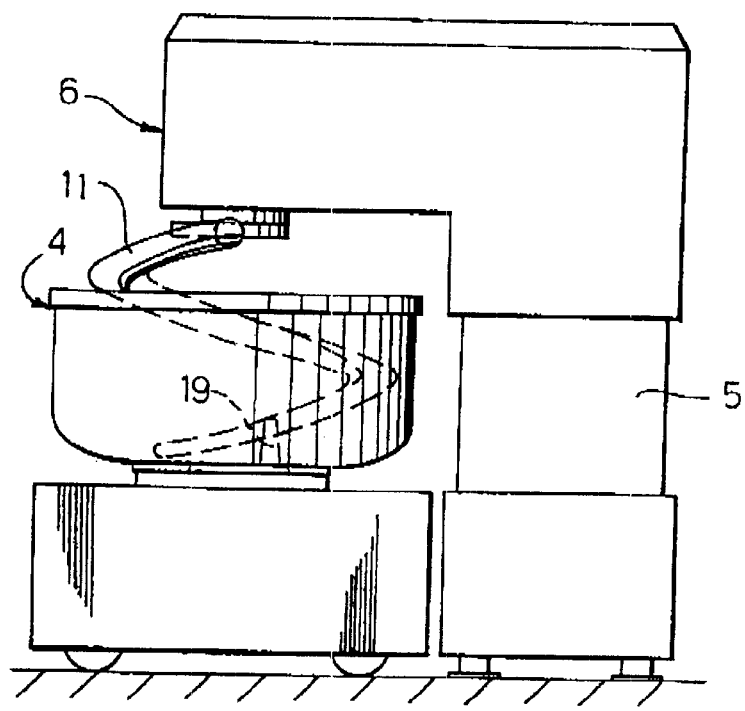
Fig_3
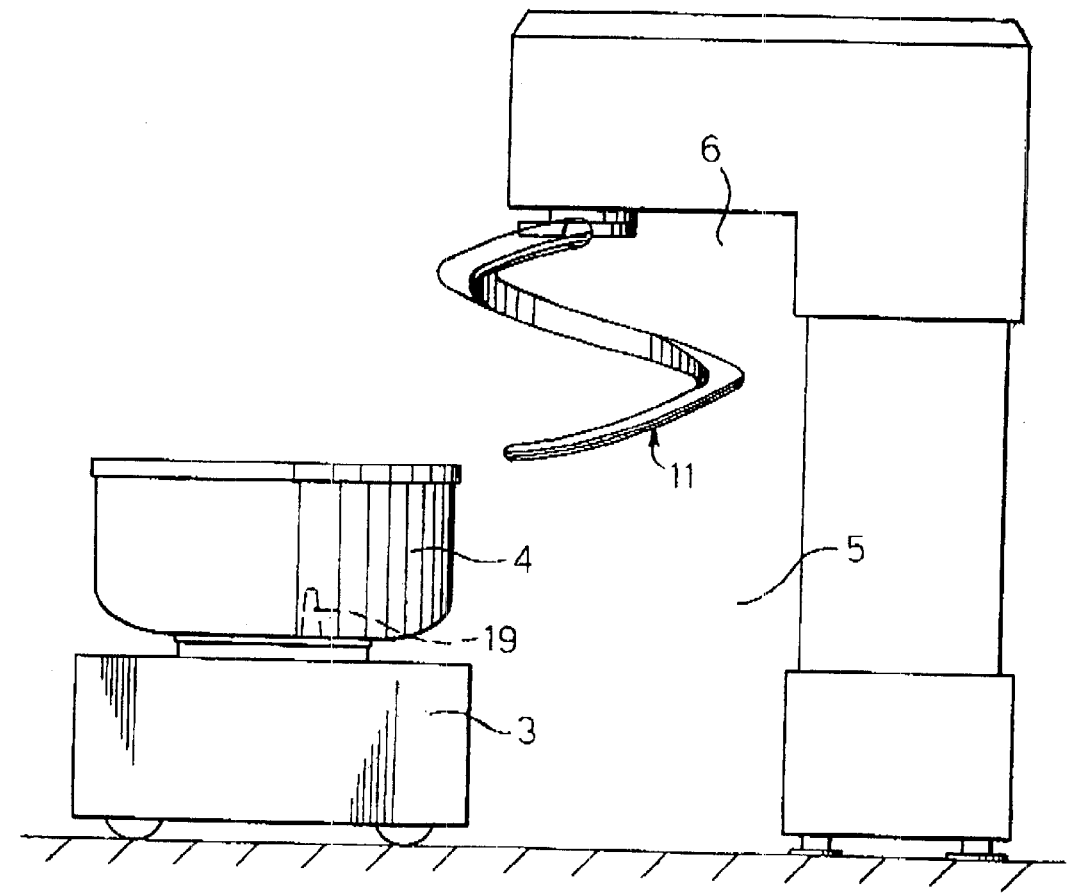
Fig_4

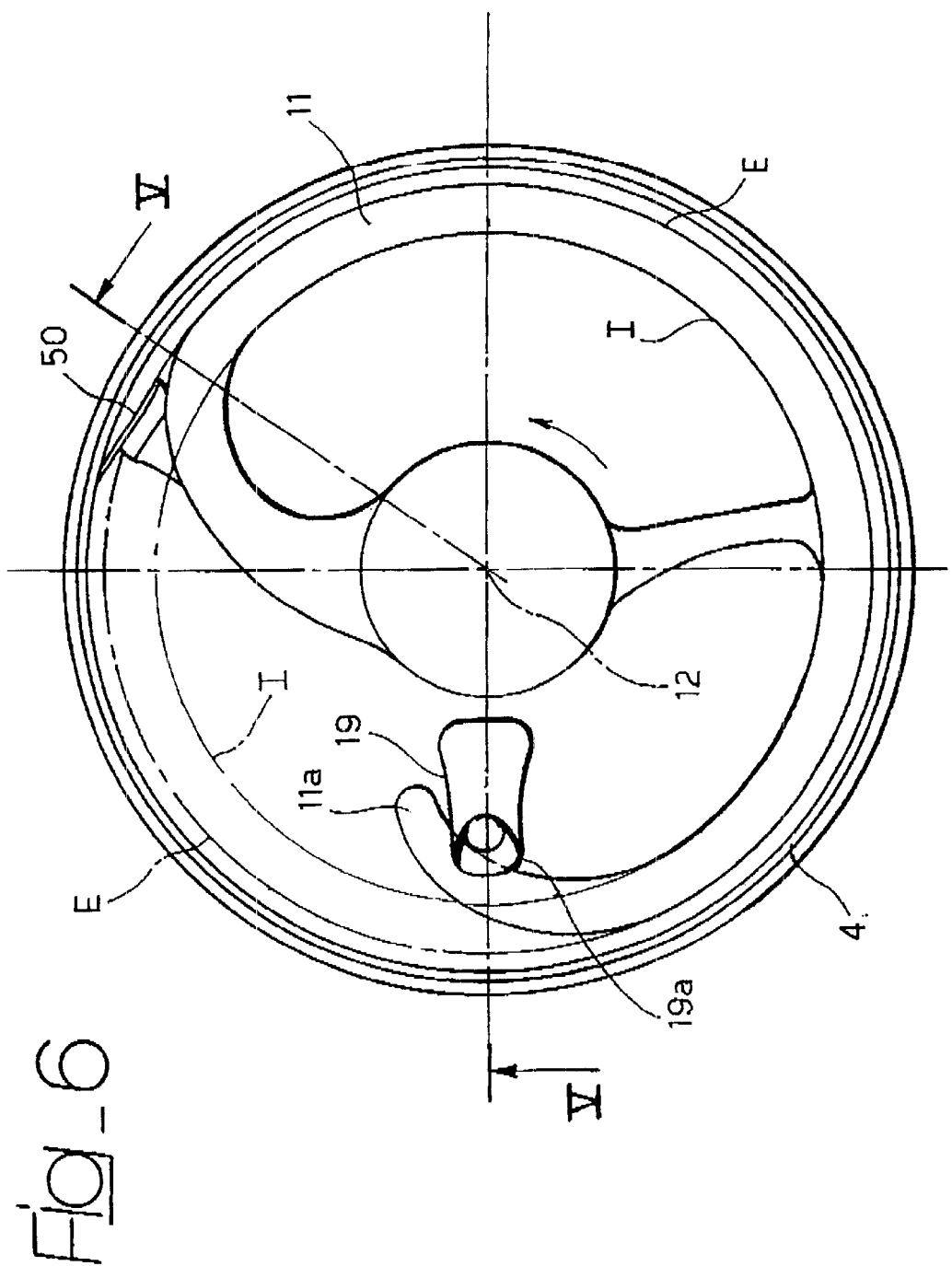
Fig_6

SPIRAL-TYPE KNEADING MACHINE WITH A NON-ROTATING BOWL FOR THE PREPARATION OF FLOUR-BASED MIXTURES

BACKGROUND OF THE INVENTION

The present invention relates to spiral-type kneading machines for industrial use for preparing flour-based mixtures. In particular, the invention relates to the field of so-called "spiral-type" kneading machines, i.e. of the type comprising a supporting structure, a bowl carried by the supporting structure, and spiral-shaped rotating mixing means arranged within the bowl.

According to the conventional art, the bowl for the preparation of the mixture has a circular shape and is driven in rotation around its axis. The kneading means consist of a spiral shaped tool which protrudes downwards inside the bowl starting from an auxiliary supporting structure which projects in a cantilever fashion above the bowl. The spiral-shaped tool is driven in rotation about an axis spaced apart from the axis of the bowl and has an overall volume which therefore occupies only a portion of the space contained inside the bowl. The rotation of the bowl has precisely the purpose of bringing the various portions of the product contained in the bowl into the area occupied by the mixing tool. In addition, precisely because the spiral-shaped tool occupies an eccentric part of the space inside the bowl, in these known machines there is at times present a central column either protruding from the bottom of the bowl or descending from a head that surmounts the bowl, in order to delimit, on the side facing towards the center of the bowl, the space swept by the mixing tool, and thus to favour better working of the mixture between the tool and the wall of the bowl.

The machines of the above described type have undergone various developments. The applicant has devised and developed various improvements (see for example the European Patents EP-B-0 354 190, EP-B-0 551 571 and EP-B-0 714 606), such as the use of two or more spiral-shaped tools or the solution of a machine operating in a continuous way to produce a continuous flow of mixed product. Naturally, all the above mentioned improvements increase the productivity of the machine and the quality of the product on one hand, but on the other hand they imply more or less burdensome complications in the structure of the machine itself, and consequently entail an increase in machine cost.

A kneading machine for laboratories is also known (see U.S. Pat. No. 5,906,432), which can be used to test mixtures, comprising a non-rotating bowl, kneading means arranged within the bowl, comprising at least one spiral-shaped tool, consisting of a substantially helical arm lying between two theoretical co-axial cylindrical surfaces, which are tangent to this helical arm on the outer and inner side thereof, and a fixed member for engaging the mixture, projecting from the bottom of the bowl.

However, in the case of this known machine, the axis of the kneading tool is always out of centre with respect to the bowl, as in the above described conventional machines, and the tool has a theoretical cylinder which occupies only a portion of the space within the bowl. Furthermore, since the bowl does not rotate, in this case the axis of the kneading tool is driven through a planetary path around the bowl axis, in order to engage the entire product contained within the bowl. The solution implies a relatively complicated structure of the machine and does not allow in any case for a very reduced kneading time. Furthermore, the fixed member provided in this machine is arranged at the centre of the bowl.

From document EP-A-0 000 512, a mixing device is also known for powder-like bulk solids comprising a non-rotating container and a stirring tool with a rotating auger at the center of the container occupying the entire inner space of the container. Devices of this type belong to a class of products which is out of the field of the invention, since they make use of auger-type stirrers which have only the function to displace the solid particles inside the container and could not provide a kneading action in any way. Furthermore, in this known device a fixed member co-operating with the rotating member is absent, since no kneading action is requested therein.

SUMMARY OF THE INVENTION

The object of the present invention is that of providing a spiral-type kneading machine for industrial use, for the preparation of flour-based mixtures, which has an extremely simple structure and at the same time is able to substantially shorten the time necessary for obtaining a dough of the desired quality.

In view of achieving this object, the present invention provides a kneading machine comprising:

a non-rotating bowl, kneading means arranged within the bowl, comprising at least a spiral-shaped tool consisting of a substantially helical arm lying between two theoretical coaxial cylindrical surfaces which are tangent to the helical arm on the outer and inner side thereof, and a fixed member for engaging the mixed dough projecting from the bottom of the bowl, characterised in that:

said spiral-type kneading tool has its axis substantially coincident with the axis of the bowl and occupies substantially the entire apace contained within the bowl, said fixed member projecting from the bottom of the bowl is spaced from the central axis of the bowl, so as to engage the product being mixed, preventing the formation at the centre of the bowl of a mass of product which could tend to be driven in rotation around itself by the kneading tool, without being mixed.

In a preferred embodiment of the invention, the above mentioned fixed member is in form of a finger projecting upwardly from the bottom of the bowl and having a curved portion which is substantially tangent to the theoretical inner cylindrical surface of the spiral-shaped tool, so as to cooperate with the kneading tool in the kneading action. Preferably, the circular bowl has a planar bottom wall and a cylindrical wall having a lower portion with a rounded profile connected to the bottom wall. In this case, also preferably, the kneading tool has a lower end portion which extends adjacent to said lower portion with rounded profile of the bowl and projects radially inwardly from said theoretical cylindrical surface of the tool. In this manner, the formation of a mass of non-mixed product at the center of the bowl is further prevented. As a consequence of this arrangement, the fixed member has a base located on the bottom of the bowl at a distance from the axis of the bowl which is lower than that of the lower end of the kneading tool, and a main portion located at a greater distance. Preferably, the fixed member is constituted by a finger with a circular cross section and the above mentioned main portion thereof extends substantially in a radial plane relative to the bowl and has a curved shape, with a concavity facing towards the axis of the bowl, so that said fixed member has an overall shape in form of a sickle. Studies and tests of the applicant have shown that this shape gives particular advantages with regard to the co-operation between the fixed member and the kneading tool during the kneading action, so that the kneading time is decreased, while the fixed member fulfils its function of preventing formation of a non-mixed mass of product. It is believed that this more efficient kneading action is due to that the spiral-shaped tool presses the dough to be mixed by making it to pass forcibly through a narrow passage between the wall of the circular bowl and the above mentioned curved portion of the fixed member.

Also in the case of the preferred embodiment, the bottom of the wall has a removable portion for discharge of the mixed product at the end of the kneading cycle. However, a solution is not excluded which makes use of an auxiliary supporting structure for the spiral-shaped tool which is vertically movable between a lowered operative position and a raised operative position, in which the spiral-shaped kneading means come out of the bowl so that the latter may be moved away in order to be emptied.

According to a further preferred feature of the invention, the spiral-shaped tool has a scraper in sliding contact with the inner surface of the bowl, preferably constituted by a spatula made of a material having a low coefficient of friction.

BRIEF DESCRIPTION OF THE DRAWINGS

Further features and advantages of the invention will become apparent from the description which follows with reference to the annexed drawings, given purely by ay of non-limiting example, in which:

FIG. 1 is a diagrammatic sectional side view of a first embodiment of the kneading machine according to the invention, FIG. 2 is a diagrammatic plan view of the machine of FIG. 1, FIGS. 3, 4 show two operative conditions of a variant of the machine of FIGS. 1, 2, FIG. 6 is a plan view of the assembly of FIG. 5.

DETAILED DESCRIPTION OF THE INVENTION

Figure 5:
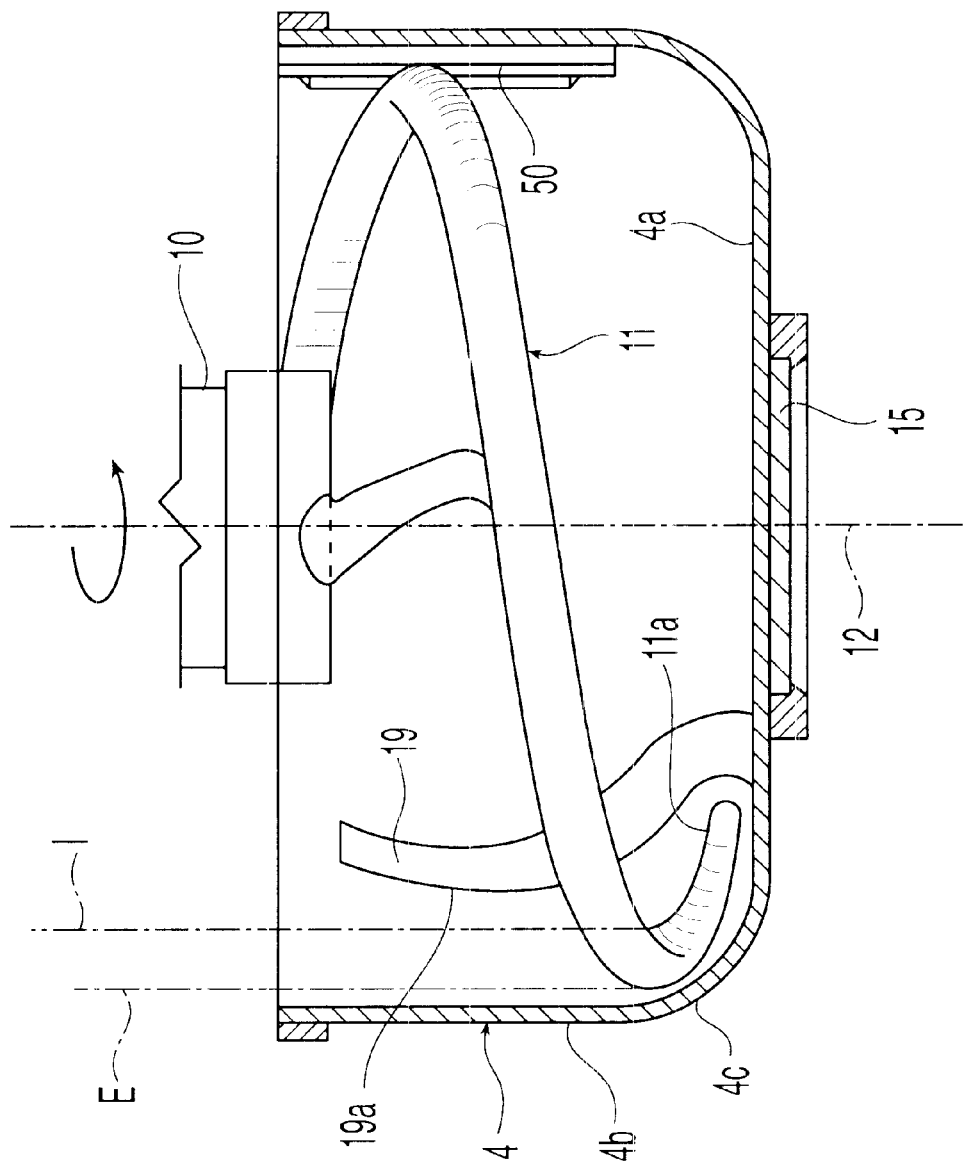
FIG. 5 is a cross-sectional view taken along line V—V of FIG. 6 of the kneading tool and the bowl of a second and preferred embodiment of the machine according to the invention.

In FIGS. 1, 2 reference numeral 1 generally designates a kneading machine for food products, particularly for preparing flour-based mixtures. The machine 1 comprises a supporting structure 2 including a base 3 on which a circular cylindrical bowl 4 is supported rigidly. From the base 3 there projects a column 5 arranged on one side of the bowl 4, the top end of this column in turn supporting a head 6 which projects in a cantilever fashion above the bowl 4. Inside the column 2 a motor unit 7 of any known type is arranged, which by means of a belt drive 8 and a reducer unit 9, drives the shaft 10 of a spiral-shaped mixing tool 11. The mixing tool 11 projects from above inside the bowl, and its axis of rotation 12 is substantially coincident with the central axis of the bowl 4. As clearly shown in FIGS. 1, 2, the kneading tool 11 is constituted by a helical arm extending between two theoretical cylindrical surfaces E,I which are coaxial with the bowl and are tangent to the tool on the outer and inner side thereof. The tool 11 substantially occupies the entire space contained within the bowl 4. Due to this feature, the kneading action is extremely efficient, and consequently the kneading time is dramatically reduced with respect to the conventional spiral-type machine. At the end of the kneading cycle, the kneaded product can be discharged from the bottom of the bowl 4. This bottom includes a disc portion 14 which is movable to open a discharge aperture 15. The disc 14 essentially consists of a plate rigidly connected to the end of a supporting lever 16 arranged below the bowl 4 and inside the base 3. The supporting lever 16 is pivotably mounted around an axis 17 on the fixed supporting structure and can be moved by means of a fluid actuating cylinder 18 (or by any other control means) between a raised operative position (shown by undotted lines in FIG. 1), in which the aperture 15 is closed, and a lowered position (shown by dotted lines in FIG. 1) in which the aperture 15 is left open for discharging the kneaded product. In the example shown in FIG. 1, the product falls on a belt conveyor 20 (diagrammatically shown by dotted lines in FIG. 1 and partially visible in FIG. 2) through which the kneaded product is moved away from the machine to be subjected to subsequent processes.

As also shown in FIGS. 1, 2 the bottom of the wall 4 is provided with an engaging member 19 in form of a vertical finger, which is at a fixed position with respect to the bowl and has the function to hinder any rotation of the kneaded product which may take place because of the rotation of the kneading tool 11. In the case of the above described solution, the engaging member 19 is carried by the movable disk 14.

As clearly shown in the drawings, the bowl 4 has a planar bottom wall 4a, and a cylindrical wall 4b having a lower portion 4c with a rounded profile connected to the bottom wall 4a. The tool 11 has a lower end 11a which extends adjacent to the curved wall 4c projecting radially inwardly from the inner theoretical cylindrical surface I of the tool 11. In this embodiment, the interference between the fixed member 19 and the end 11a of the tool is avoided, since member 19 is carried by the movable disc 14, at a position which is radially inward relative to end 19a.

FIGS. 3, 4 relate to a variant in which the removable plate 14 is not provided and the head 6 supporting the kneading tool 11 is vertically slidably mounted between a lowered operative position (FIG. 3) and a raised position (FIG. 4) in which the tool 11 comes out of the bowl 4, so that the latter can be moved away from the machine to be emptied. In this case, the bowl 4 is carried by a trolley unit separate from column 5.

Furthermore, the use is not excluded, in place of the single kneading spiral-shaped tool shown in the drawings, of two kneading tools rotating around the same axis, while the principle at the basis of the invention remains the same, which is that of providing a non-rotating bowl and kneading means which, by their action, affect substantially the entire space contained inside the bowl. The preferred embodiment of the invention, which provides for the use, in combination with the above mentioned features, of a removable disk 14 to open an aperture 15 on the bottom of the bowl for discharging the kneaded product, further improves the efficiency of the machine, while keeping all the above described advantages and without adding any substantial complication.

A further advantage of the provision of a non-rotating bowl lies in that in this manner passages or gaps for circulation of a cooling or heating fluid can be made in the bowl in a relatively simple manner.

FIGS. 5, 6 relate to a second and preferred embodiment of the machine according to the invention. In these figures, the parts corresponding to those of FIG. 1 are designated by the same reference numeral. Therefore, numeral 11 designates the spiral-shaped tool having a vertical axis 12 of rotation coincident with the vertical axis of the bowl 4, this bowl having a cylindrical wall and a bottom wall, including a circular central portion 15 which is removable, in a manner similar to that shown in FIG. 1.

As clearly shown in FIGS. 5, 6, the spiral-shaped tool 11 is preferably provided with a scraper 50 constituted by a spatula of a material having a low friction coefficient. The spatula 50 is in sliding contact with the inner surface of the wall of the bowl 4 so as to keep this surface clean during the kneading cycle. Also in the case of the preferred embodiment illustrated herein, the removable portion 15 of the bowl bottom is constituted by a circular disc having its axis substantially coincident with the axis 12 of the bowl and that of the kneading tool 11.

The fixed member 19 has a base portion rigidly connected to the fixed part of the bottom of the bowl, immediately outside the removable portion 15. The fixed member 19 is substantially in form of an elongated finger extending upwardly from the bottom of the bowl, with a sickle-shaped profile including a curved portion 19a lying in a radial plane relative to axis 12, with its concavity facing towards the axis 12. This curved portion has its radially outer surface which is substantially tangent to the theoretical inner cylindrical surface I of the tool 11. Also in this case, the tool has one end 11a which extends along the rounded portion 4c of the wall of the bowl, projecting radially inwardly from the theoretical surface I. However, the interference between the end 11a and the fixed member 19 is avoided since member 19 has a base which is radially more inwardly located with respect to the end 11a, the member 19 having its curved portion 19a which comes closer to the surface I of the tool 11. As already indicated above, the function of the member 19 is that of preventing the formation of a ball of dough at the centre of the bowl, which could be rotated around itself by the tool 11 without being kneaded. However, a further advantage, even more important, of the fixed member 19 is that of co-operating with the tool 11 in the kneading action. As a matter of fact, the tool 11 presses the dough to be kneaded by causing it to pass forcibly through the narrow passage between the wall of the bowl and the curved portion 19a of the member 19 which is tangent to the theoretical inner cylindrical surface I.

For the rest, the structure and operation of the machine shown in FIGS. 5, 6, are substantially identical to those of the machine of FIG. 1.

Naturally, while the principle of the invention remains the same, the details of construction and the embodiments may widely vary with respect to what has been described and illustrated purely by way of the example, without departing from the scope of the present invention.

What is claimed is:

1. Spiral-type kneading machine for preparing flour-based mixtures, comprising:

a non-rotating circular bowl, kneading means arranged within the bowl comprising at least one spiral-shaped tool constituted by a substantially helical arm lying between two theoretical coaxial cylindrical surfaces (E, I) which are tangent thereto from the outside and the inside, and a fixed member for engaging the dough, projecting from a bottom of the bowl, wherein:

said spiral-shaped kneading tool has its axis substantially coincident with the axis of the bowl and occupies substantially the entire space contained within the bowl, said fixed member projecting from the bottom of the bowl is spaced from the central axis of the bowl, so as to engage the product being kneaded preventing the formation at the center of the bowl of a mass of product which would tend to be rotated around itself by the kneading tool, without being kneaded.

2. Kneading machine according to claim 1, wherein said fixed member is in form of a finger projecting upwardly from the bottom of the bowl and having a curved portion substantially tangent to the theoretical inner cylindrical surface (I) of the spiral-shaped tool, so as to cooperate with the kneading tool during the kneading action.

3. Kneading machine according to claim 2, wherein said circular bowl has a planar bottom wall and a cylindrical wall having a lower portion with a rounded profile connected to the bottom wall and in that said kneading tool has a lower end portion which extends adjacent to said lower portion of the bowl having a rounded profile, said lower end portion projects radially inwardly from said theoretical inner cylindrical surface (I) of the tool.

4. Kneading machine according to claim 3 wherein said fixed member has a base located on the bottom of the bowl at a distance from the axis of the bowl which is lower than that of the lower end portion of the kneading tool, said fixed member comprising a main portion located at a greater distance from the axis of the bowl.

5. Kneading machine according to claim 4 wherein the fixed member is constituted by a finger having a circular cross-section and in that said main portion extends substantially in a radial plane of the bowl and has a curved shape with a concavity facing towards the axis of the bowl, so that the fixed member has an overall shape in form of a sickle.

6. Kneading machine according to claim 1, wherein the bottom of the bowl includes a removable portion for discharging the kneaded product.

7. Kneading machine according to claim 6 wherein said fixed member is located on a fixed part of the bottom of the bowl.

8. Kneading machine according to claim 6 wherein said fixed member is carried by said removable portion of the bottom of the bowl.

9. Kneading machine according to claim 1, wherein the spiral-shaped tool has a scraper in sliding contact with the inner surface of the bowl.

10. Kneading machine according to claim 9, wherein the scraper is constituted by a spatula of a material having a low friction coefficient.

\* \* \* \* \*